L. B. PURCELL.
FIREARM.
APPLICATION FILED SEPT. 2, 1914.
1,140,715.
Patented May 25, 1915.
5 SHEETS—SHEET 4.
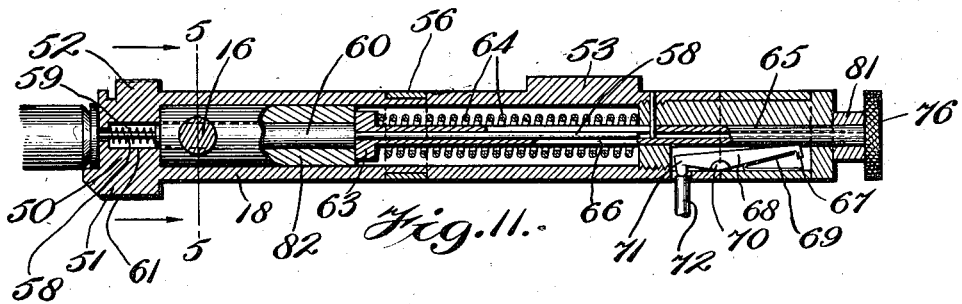
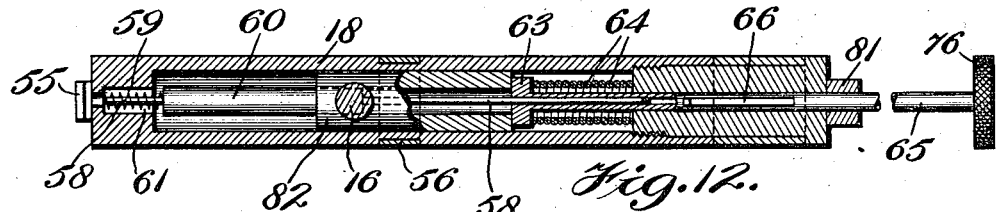
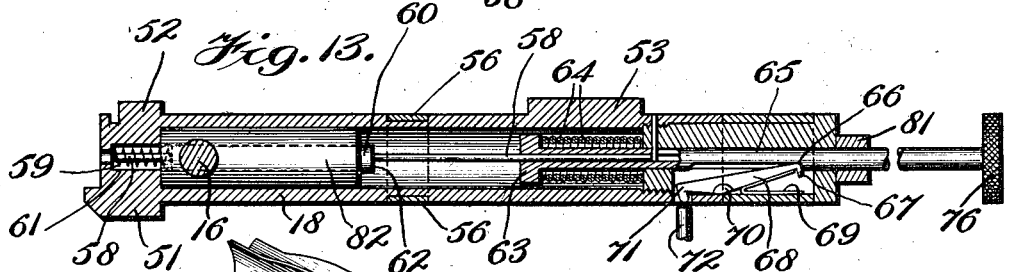
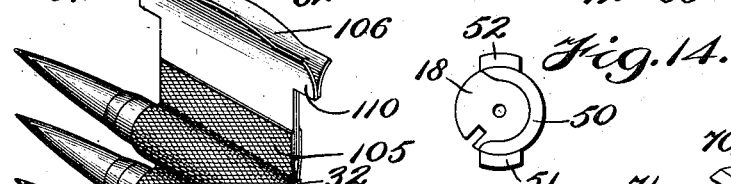
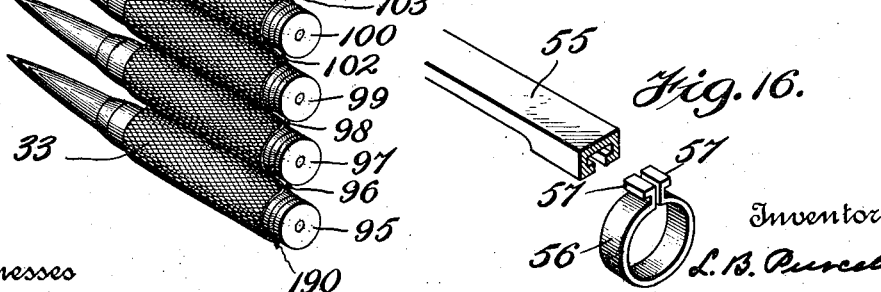
Witnesses
Byron B. Collings.
Helen A. Marston.
Inventor
L. B. Purcell
By
Attorney

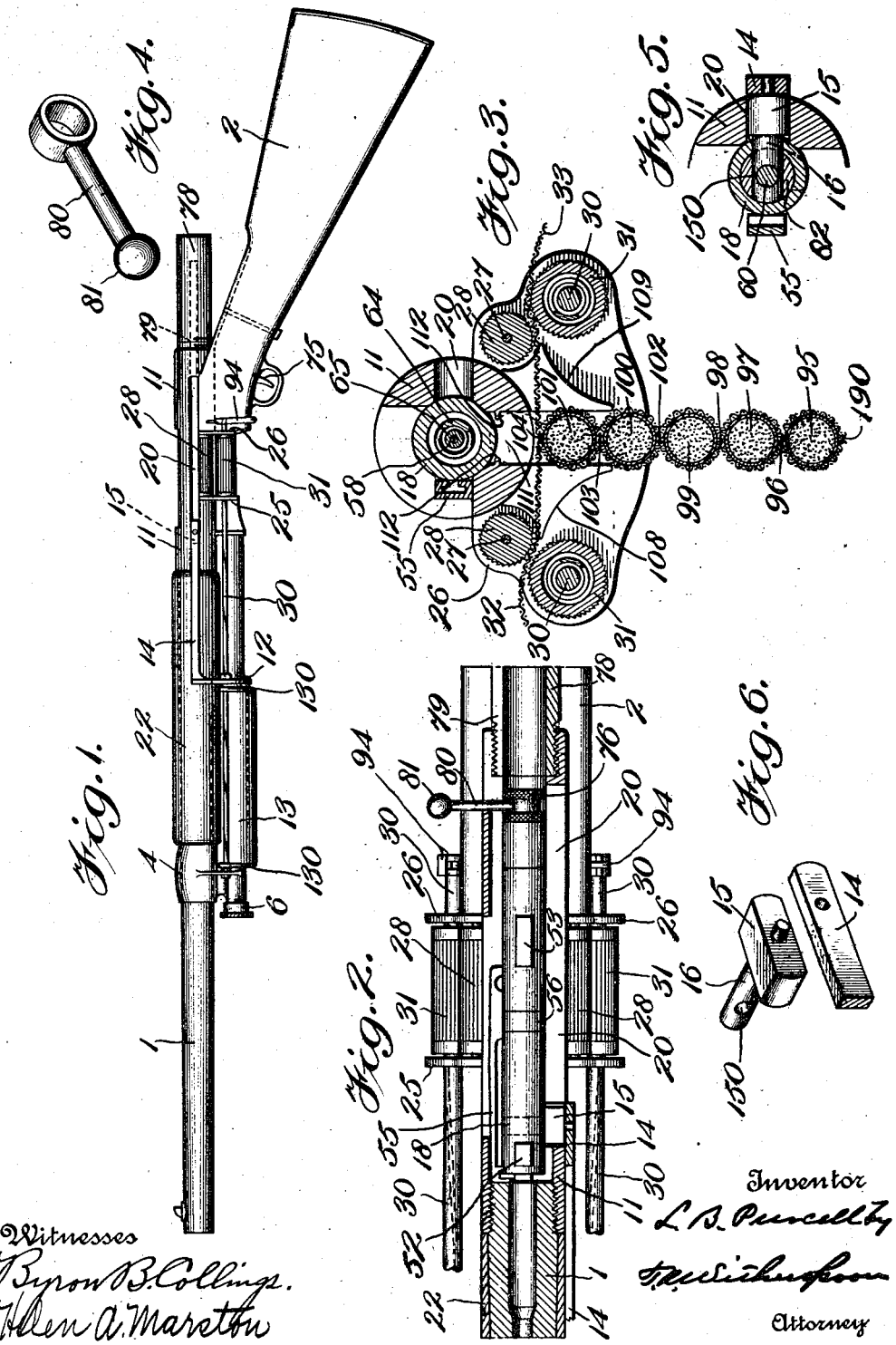

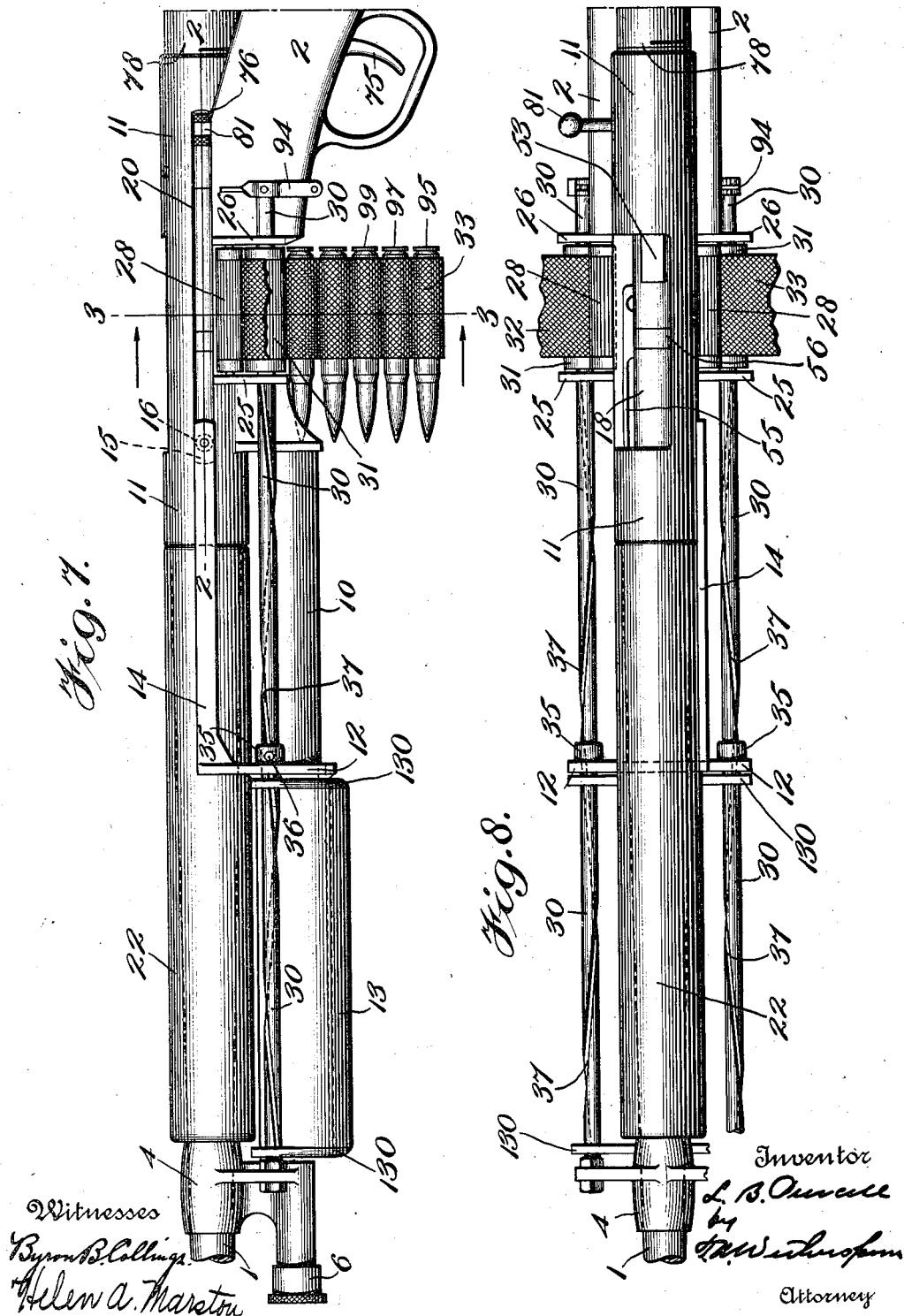

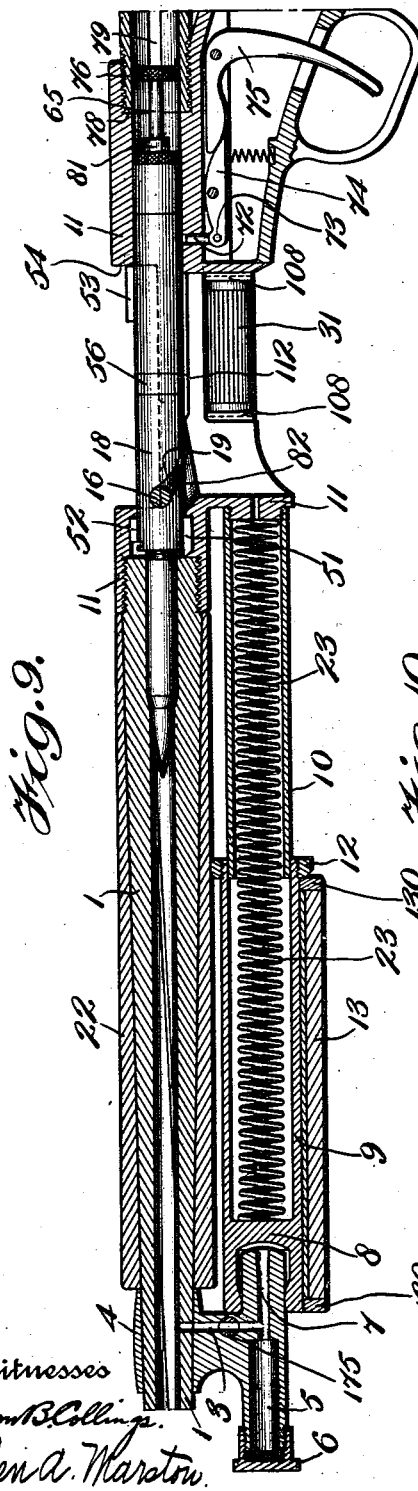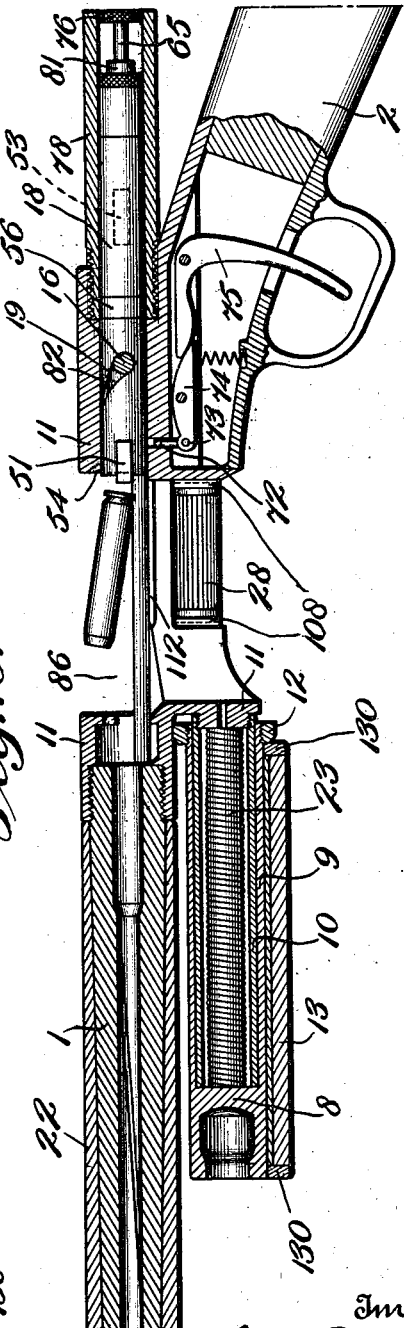

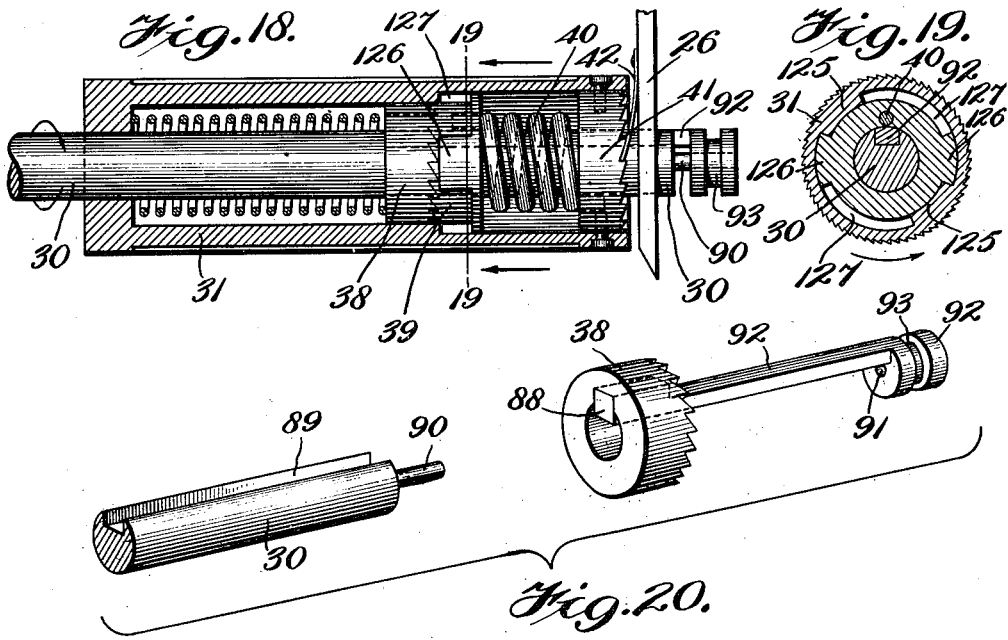

UNITED STATES PATENT OFFICE.

LEE B. PURCELL, OF THE UNITED STATES NAVY.

FIREARM.

1,140,715.   Specification of Letters Patent.   Patented May 25, 1915.

Application filed September 2, 1914. Serial No. 859,803.

*To all whom it may concern:*

Be it known that I, LEE B. PURCELL, captain, United States Marine Corps, and a citizen of the United States, at present attached to the U. S. S. *Virginia*, have invented certain new and useful Improvements in Firearms; and I do hereby declare the following to be a full, clear, and exact description of the invention, such as will enable others skilled in the art to which it appertains to make and use the same.

This invention relates to fire arms, and has for its object to provide a fire arm which will be simple in construction, efficient in action, and more certain in operation than those that have heretofore been proposed.

With these and other objects in view the invention consists in the novel details of construction and combinations of parts, more fully hereinafter disclosed and particularly pointed out in the claims.

Referring to the accompanying drawings forming a part of this specification, in which like numerals designate like parts in all the views:—Figure 1 is a side elevational view of a fire arm made in accordance with my invention; Fig. 2 is a longitudinal sectional detail view taken on the line 2—2 of Fig. 7, looking in the direction of the magazine;
Fig. 3 is a cross sectional view taken on the line 3—3 of Fig. 7, looking in the direction of the arrows; Fig. 4 is a perspective view of the cocking lever; Fig. 5 is a sectional detail view taken on the line 5—5 of Fig. 11, looking in the direction of the arrows; Fig. 6 is a perspective view of a portion of the operating rod and its block attachment to the breech bolt; Fig. 7 is an enlarged side elevational view similar to Fig. 1, but showing a supply of cartridges in position ready for firing; Fig. 8 is a plan view of the parts shown in Fig. 7; Fig. 9 is a longitudinal sectional view of the parts shown in Fig. 8, with the parts ready for firing and the cartridges in their holder being omitted; Fig. 10 is a view similar to Fig. 9 showing the position of the parts after firing and when the shell is being discharged; Fig. 11 is a longitudinal sectional view of the breech bolt with the parts in their positions after firing; Fig. 12 is a similar view of the parts shown in Fig. 11 showing the position of the parts when the breech is open; Fig. 13 is a view similar to Fig. 12 showing the position of the parts ready for firing; Fig. 14 is an elevational view of the muzzle end of the bolt; Fig. 15 is a perspective view of a convenient form of sear; Fig. 16 is a perspective view of one end of the extractor and a spring band for holding the same to the breech bolt; Fig. 17 is a perspective view of a cartridge clip or belt of peculiar construction; Fig. 18 is a longitudinal sectional view on an enlarged scale of one of the lower rollers for moving one of the webs of the clip shown in Fig. 17; Fig. 19 is a sectional view on the line 19—19 of Fig. 18 looking in the direction of the arrows; Fig. 20 is a perspective view of a portion of the operating rod, a clutch member and its coacting parts associated with the roller shown in Fig. 18; Fig. 21 is a cross sectional view taken through the receiver at the line 3—3 of Fig. 7, looking toward the muzzle of the gun, the breech bolt and feed rollers being omitted and a modified form of cartridge holder being illustrated; and Fig. 22 is a view similar to Fig. 21 showing the cartridge holder in another position.

1 indicates any suitable barrel, 2 any suitable stock and 3 any suitable passage from the barrel adapted to conduct the gases of explosion therefrom. The said passage 3 is inclosed in a member 4 surrounding the barrel and provided with an enlarged chamber 5 provided with a nipple 6 adapted to control the escape of gases from the passage 3. Also leading from the passage 3 is a passage 7 adapted to cause gases to impinge against the shoulder or other member 8 carried by the tube 9 telescoping over the tube 10 attached to a portion of the receiver 11. Surrounding the rear end of the tube 9 is a collar 12 and slidably mounted on said tube is the hand operated grip member 13, provided at each end with the supporting members 130 through which pass the operating rods 30, all as will be more fully disclosed below.

Attached to the collar 12 is an operating rod 14, attached at its rear end to a block 15 having a pin 16 entering a cam groove 19 in the breech bolt 18. The said block 15 slides backward and forward in the slot 20 of the receiver. I prefer to inclose the rear portion of the barrel by a casing 22 of wood or other insulating material in order to prevent burning the hands of the operator.

A spring 23 is inclosed by the tubes 9 and 10 in order to return the parts.

As best shown in Figs. 2, 3, 7 and 8 the receiver is provided on each side with the brackets 25 and 26 in which are mounted the pins 27 carrying the upper rollers 28. Also mounted between the brackets 25 and 26 on the operating rods 30 are the lower rollers 31. The rollers 28 and 31 are provided with the reversely inclined serrations or teeth, illustrated in Fig. 3 and said teeth are adapted to grip the webs 32 and 33 of a cartridge clip or holder to be disclosed below.

The collar 12 extends on each side of the tube 9 sufficiently to permit the rods 30 to pass therethrough, as best shown in Fig. 8 and I also rigidly secure to said collar the short sleeves 35 provided with the pins 36 best shown in Fig. 7 which travel in the grooves 37 with which the rods 30 are provided. The said operating rods 30, as best shown in Fig. 18 enter the lower rollers 31 and on the rear end of each rod is secured the clutch member 38 engaging the companion clutch member 39 loosely mounted on the said rod 30. The companion clutch members 39 are attached to coiled springs 40 loosely surrounding the operating rods 30, and said springs 40 are also each attached to a ratchet 41 rigidly secured to each lower roller 31 as will be clear from Fig. 18. A spring 42 prevents said ratchet 41 and said roller 31 from turning in a direction opposite to that in which the rod 30 turns the same.

From the mechanism so far disclosed it will now be clear that as the hand grip 13 is moved to the rear the operating rod 14 will cause the breech bolt 18 to be rotated by means of the pin 16 engaging the groove 19, and when the said pin reaches the end of said groove 19, the said bolt will be carried to the rear into the position shown in Fig. 10. The rear movement of the hand grip 13 will also rotate the operating rods 30 by reason of the pins 36 engaging the cam grooves 37 in said rods, and the rotation of the said rods 30 will compel the rotation of the clutch member 38, the companion clutch members 39 and the power from the companion clutch members 39 will be transmitted to the springs 40 which in turn will rotate the ratchets 41 and through said ratchets the lower rollers 31. Also when the hand grip 13 is released the spring 23 will restore the parts to their normal positions. It is also clear that gas admitted through the passages 3 and 7 will likewise cause the tube 9 and its associated parts to move to the rear in the manner just disclosed, while the spring 23 will in that case also restore the parts to their normal positions. When the tube 9 is, however, forced to the rear by the pressure of the gas in the manner stated, the hand grip 13 being held by the firer, and loosely mounted, as described, will not move to the rear, but will remain in its forward position, where it will be supported by the end brackets 130 through which pass the operating rods 30. In this forward position said grip 13 not only prevents the motor gases from burning the operator's hand, but it also serves as a guide to insure the proper return of the tube 9 to its forward or normal position.

The breech bolt, best illustrated in Figs. 11 to 14 consists of a head 50 of any suitable construction, but as illustrated provided with the holding lugs 51 and 52 and 53. The lugs 51 and 52 take in corresponding recesses in the forward end of the receiver while the lug 53 fits against the face 54 in the rear portion of the receiver.

55 indicates an extractor attached to the bolt 18 by means of the spring band 56 loosely mounted in a groove in the said bolt, whereby the said bolt is free to oscillate on its axis within said band and will impart the necessary reciprocating movements through said band to the extractor. The said band 56 is preferably provided with ears 57 adapted to slip into corresponding grooves in the extractor, but any other suitable fastening means may be employed. The firing pin 58 is preferably provided with a spring 59 and with an enlargement 60 adapted to enter the bore 61 with which the bolt 18 is provided.

The said enlargement 60 also passes through the hole 150 in the pin 16, thus preventing the said pin and the block 15 from becoming accidentally displaced. The rear end 62 of said enlargement 60 is adapted to be struck by the hammer 63 controlled by the firing spring 64 and said hammer 63 is provided with a rearward extension 65 provided with a sear notch 66 against which the rear end 67 of the sear 68 is adapted to take. The said sear 68 is controlled by a sear spring 69 and may be pivoted as at 70. The forward end 71 of said sear is under the control of a pin 72 pivoted as at 73 to a lever 74 under the control of the trigger 75 as illustrated. Of course any other suitable form of firing mechanism may be provided. The rear extension 65 of the hammer may be provided with any suitable cocking means, and I have shown a milled head 76 which is preferably housed in an extension 78 of the receiver as shown, and which extension is provided with a slot 79 through which the handle 80 of a hand cocking lever 81 passes. Said lever 81 preferably fits the said rear extension 65 as best illustrated in Fig. 2, and abuts the said knurled head 76 as will be clear from the drawings.

The hand cocking lever 81 is only to be used when it is desired to cock the piece through the medium of such a lever. Ordinarily when the yoke 12 and action slide 14 are brought to the rear the piece will be cocked by the means now to be disclosed. As best shown in Fig. 5 the operating rod is attached to a block 15 working in a slot 20 of the receiver 11 and said block 15 is provided with a pin 16 which extends through the bolt 18 and the tube 82 located on the inside of said bolt 18 and surrounding the enlargement 60 of the firing pin. It therefore follows that as the said pin 16 is drawn to the rear through the movement of the rod 14 and block 15, the said tube 82 will be carried to the rear thus forcing the hammer 63 and sear notch 66 to the rear, until the said notch is engaged by the end 67 of the sear, and the piece thus cocked. On the other hand when the cocking lever 81 is forced to the rear by hand the hammer through its extension 65 is directly brought to the rear until the sear engages the said notch 66. The said hammer is hollow as shown so that the extreme end of the firing pin 58 enters the same, and so that its spring 59 may readily retract the said pin within the face of the bolt as illustrated in Figs. 12 and 13 when the piece is cocked.

It will now be clear from what has been so far disclosed that by operating the grip 13 the breech may be opened and cartridges inserted one at a time through the opening 86 in the receiver, and the arm thus used as a single loader.

When using the arm as a single loader it is desirable that the rollers 31 be not operated, and to this end I provide a means for throwing out of engagement the clutch members 38 and 39 now to be described. The clutch member 38, as best shown in Fig. 20 is provided with a splined member 88 adapted to fit a groove 89 in the extreme rear end of the operating rod 30, and the said operating rod 30 is provided with the pin 90 adapted to fit a hole 91 in the extreme end of an extension 92 of the said spline 88. The said extreme end 92 of the said spline is further provided with a groove 93 into which fits a thumb lever 94 illustrated in Figs. 1, 2, 7 and 8. It results from the construction thus disclosed that upon moving the said lever 94 toward the muzzle the clutch member 38 will slide on its corresponding operating rod 30 until its teeth are disengaged from the teeth of the corresponding clutch member 39, so that the said operating rod 30 may be turned without operating said clutch member 39 and roller 31.

When it is desired to use the gun as a magazine loader I may provide any suitable form of magazine or other means for holding the cartridges, but I prefer the mechanism illustrated in Figs. 3 and 17 and now to be described.

I preferably take two pieces of fabric, such as 32 and 33 which may be of any suitable construction and suitably fasten them together at one end, as by the stitching 190. I next inclose a cartridge such as 95 between the members 32 and 33 and secure the parts together as by stitching at 96. I next inclose another cartridge as 97 between the pieces of fabric and secure it as by stitching at 98. In the same way successive cartridges 99, 100 and 101 are secured between the pieces of fabric as at 102, 103 and 104 respectively, thus leaving the extreme ends 105, and 106 of the fabric which may be suitably finished off in the form of metal or leather pieces or of other material, as may be desired. I prefer that the extreme end shall be finished off in metal and curved as shown so that when the cartridges are presented in position they will readily pass between the serrated rollers 28 and 31, as best illustrated in Fig. 3. That is to say, the brackets 25 and 26 of the receiver 11 are provided with curved surfaces 108 and 109 over which the extensions 110 of the said metal pieces 105 and 106 may take, and thereby facilitate the bringing of the cartridges up into the proper position for feeding the folds of the fabric between the rollers 28 and 31.

The said pieces of fabric or clip members 32 and 33 having been positioned between said rollers the movement of the action bar 14, or of the grip piece 13 to the rear will cause the driving rollers 31 to support the said members 32 and 33 and to rip the seam as at 104, thus freeing the cartridge 101 while at the same time forcing the said cartridge 101 from its full line position shown in Fig. 3 up through the slot 111 in the receiver and into the dotted line position indicated in said Fig. 3. The said slot 111 is provided with two extensions or lands 112 against which the body of the cartridge takes and thereby prevent the said cartridge from moving upward any farther. The upper curved portion of the said body however extends between said lands and upward into the path of the bolt 18 as illustrated by the said dotted lines in Fig. 3, so that as the bolt comes forward to its firing position, it picks up the cartridge which has been freed from the clip members 32 and 33 and forces the same into the breech in the usual manner. When the firing takes place, the cartridge shell is extracted in the usual manner, it is ejected by an ejector not shown, while the driving rollers 31 further separate the fabric clip members 32 and 33, ripping the next seam 103 and bringing another cartridge into place, and the above operation is repeated as long as there are cartridges to be fed. When all of the cartridges are exhausted the fabric or clip members may be removed from the piece by ripping the seam 190, which will occur when the last cartridge has been fired.

Any convenient number of cartridges may be held in the fabric clip and whereas I have shown only six in Fig. 17, it is perfectly feasible to use ten, twelve or more.

In fact if the gun is to be used as a gas operated gun long strips of cartridges may be used or employed and supported in any convenient manner near the gun, so that the piece would become an automatic gas operated gun.

I regard the particular means of putting up and holding my cartridges as an important feature of my invention in that it supplies a flexible clip or holder for the cartridges which can be carried in the form of belts, in cartridge boxes or elsewhere and possesses the very important advantage that the operator is not limited to any given number of shots. In other words, unlike the metallic clips heretofore used this piece is not limited to any given number of shots and can readily be changed to a single loader, to a magazine loader of three, six, ten or more cartridges or can even be changed into an automatic gas operated gun firing as many cartridges as is supplied by my flexible holders.

In addition to the above my said flexible holders or clips illustrated in Fig. 17 are applicable to any style of ammunition.

In the modified form of cartridge feed illustrated in Figs. 21 and 22, I have illustrated a box or cosing for holding my flexible clips in position when a large number of cartridges is to be employed. That is to say in Fig. 21, between the brackets 25 and 26 I secure by any suitable means a box 120 ninged to a companion box like member 121 as at 122 and also provided with the hinge 123. Between the two members 120 and 121 may be folded my flexible cartridge clip carrying say ten cartridges and the folds 32 and 33 of the said clip may be led out between the rollers 28 and 31 as illustrated in Fig. 3, whereupon the said folds will be ripped apart and the cartridges fed to the breech as has been disclosed above in connection with Fig. 3. On the other hand, as best illustrated in Fig. 22 when it is desired to use the gun with a larger number of cartridges in my flexible clip the member 120 may be folded back into the position shown in Fig. 22 and out of the way so that a belt of cartridges or a clip containing any desired number of cartridges may be fed up directly to the gun and the same operated by the gases of explosion or by hand as may be desired.

Whether the gun is hand operated or gas operated it is desirable to take up or provide for stretching or any inequalities in the fabric or folds 32 and 33. To this end I have provided the spring 40 as a connection between the clutch members 39 and the ratchet 41 as above disclosed, and in order to still insure that the feed shall properly take place in case the power required is more than will be transmitted by the spring I have provided on the interior of the rollers 31 the lugs 125 and on the exterior of the clutch members 39 the lugs 126 which move in the grooves 127 on the interior of the said rollers 31. It results from the construction thus disclosed that whenever the relative movement between the clutch member 39 and the rod 30 is more than will be taken care of by the spring 40 that the lugs 126 will travel in the grooves 127 and take against the lugs 125, so that the rollers 31 will be positively driven from the rods 30.
The operation of my improved fire arm will be clear from the foregoing but may be briefly summarized as follows: The fire arm may be used as a single loader in which case the breech is opened by moving the hand grip 13 to the rear, thus causing the operating rod 14 through the pin 16 and grooves 19 to rotate the bolt 18 on its axis thus unlocking the same and moving the said bolt, to the rear. Cartridges one at a time may be then inserted through the opening 86 in the receiver and the bolt will be automatically returned by the spring 23. The piece at the same time is cocked by means of the pin 16 passing through the tube 82 carried in the hollow of the bolt 18, and which tube impinges against the hammer 63 and carries the same to the rear until the sear notch 66 is caught by the end 67 of the sear 68. The piece may also be cocked by hand by simply moving the cocking lever 81 to the rear in which case the body 80 of said lever slides in the slot 79 with which the extension 78 of the receiver 11 is provided. Said cocking lever also enables one to hold the hammer back after the sear is released and to let the hammer move forward and thus relieve the tension of the firing spring 64 when it is desired to do so.

When it is desired to use the arm as a magazine loader any suitable magazine may be provided, but it is preferred to employ the form of flexible cartridge clips illustrated in Fig. 17. These clips are made by placing two pieces of a suitable fabric together, sewing the same between the cartridges, leading the bights 32 and 33 between the ripping rollers 31 which rollers are turned in opposite directions by means of the operating rods 30 as the hand grip moves to the rear and which rollers accordingly rip the seams between the cartridges one at a time, while at the same time causing the cartridges to be fed up one at a time against the lands 112, Fig. 3, and into the path of the bolt 18. The bolt 18 accordingly picks up the cartridges one at a time and forces them into the breech of the gun. These flexible clips constitute an improved feature of the invention and they may be made to hold any desired number of cartridges so that they are not limited to a fixed number as has been the case with metal clips.

When it is desired to use the gun as an automatic gas operated gun, gas may be admitted through the passage 3 into the passage 7, and the abutment 8 and its associated parts blown back after each shot in a manner well known. But when the arm is not to be used as a gas operated gun, in the manner above disclosed, a cock such as 175 (Fig. 9) may be turned to close off the entrance of gas into the passage 7.

When using the arm however as a gas operated gun, a larger number of cartridges will be carried to the gun through the clips shown in Fig. 17 and in order to support said larger number of cartridges it is convenient to provide boxes such as 120 and 121 into which the flexible clips may be folded, and the cartridges are fed one at a time from these clips in the manner above disclosed. In the still further modified form of construction shown in Fig. 22 the boxes 120 and 121 are relatively folded as illustrated and a complete belt of cartridges or a clip containing a still larger number of cartridges may be employed.

When it is desired to use the gun as a single loader it is convenient to disengage the clutch members 38 and 39 so that the feed rollers 31 will not be rotated and to this end the hand operated levers 94 are provided in order to push the clutch member 38 out of engagement with the clutch member 39, whereupon the said members 38 will rotate idly inside the rollers 31, and the latter will not be rotated.

It is obvious that those skilled in the art may vary the details of construction, as well as the arrangement of parts without departing from the spirit of my invention and therefore I do not wish to be limited to the above disclosure except as may be required by the claims.

What I claim is:—

1. In a fire arm the combination of an action slide; a breech bolt provided with a groove and a hammer; a cocking member carried by said breech bolt; and a pin connection between said slide and cocking member passing through said groove, adapted to turn said bolt, move the same to the rear and to cock the hammer, substantially as described.

2. In a fire arm the combination of an action slide; a receiver provided with a slot; a sliding block connected to said slide and provided with a pin; a breech bolt provided with a cam groove through which said pin passes; a hammer carried by said bolt; and a cocking member also carried by said bolt, connected to said pin and adapted to cock said hammer, substantially as described.

3. In a fire arm the combination of an action slide; a receiver provided with a slot; a sliding block connected to said slide and provided with a pin; a breech bolt provided with a cam groove through which said pin passes; a hammer provided with an extension carried by said bolt; a hand operated cocking lever connected to said extension; and a cocking member also carried by said bolt, connected to said pin and adapted to cock said hammer, substantially as described.

4. In a fire arm the combination of an action slide; a receiver provided with a slot; a sliding block connected to said slide and provided with a pin; a breech bolt provided with a cam groove through which said pin passes; a hammer provided with an extension carried by said bolt; an extension provided with a slot associated with said receiver adapted to house said hammer extension; a hand operated cocking means connected to said hammer extension and passing through said slot in said receiver extension; and a cocking member also carried by said bolt, connected to said pin and adapted to cock said hammer, substantially as described.

5. In a fire arm the combination of a receiver; a cartridge feed roller associated therewith; an operating means; connections between said means and roller for rotating the same; flexible means adapted to be ripped for carrying a cartridge to said receiver; and means associated with said roller for causing said flexible means to be ripped and said cartridge to be brought into position to be fed into the breech of the gun, substantially as described.

6. In a fire arm the combination of a receiver; a flexible cartridge holding means provided with folds adapted to be ripped apart; means associated with said receiver for gripping said folds and ripping them apart; and means for operating said gripping means and causing the said flexible cartridge holding means to present cartridges into position for being fed into the breech of the gun, substantially as described.

7. In a fire arm the combination of a receiver; a flexible cartridge holding fabric provided with folds adapted to be ripped apart; means comprising rollers associated with said receiver for gripping said folds and ripping them apart; and means for operating said gripping means and causing the latter through said flexible fabric to present cartridges into position for being fed into the breech of the gun, substantially as described.

8. In a fire arm the combination of a receiver; means carrying cartridges provided with flexible folds detachably secured together between said cartridges; and means for separating said folds and forcing the cartridges one at a time into position for being fed into the breech of the gun, substantially as described.

9. In a fire arm the combination of a receiver provided with lands against which cartridges may rest; means carrying cartridges provided with flexible folds detachably secured together between said cartridges; and means for separating said folds and forcing the cartridges one at a time against said lands and into position for being fed into the breech of the gun, substantially as described.

10. In a fire arm the combination of a receiver; rollers associated with said receiver; rods for actuating said rollers; a fabric provided with cartridges provided with folds adapted to be gripped by said rollers and ripped apart; and means associated with said rods for operating the same and causing said folds to be ripped apart, substantially as described.

11. In a fire arm the combination of a receiver; a breech bolt; rollers associated with said receiver; rods for actuating said rollers; a fabric provided with cartridges and having folds adapted to be gripped by said rollers; means for detachably securing said folds together between said cartridges; and means associated with said rods for operating said bolt, rotating said rods and rollers, causing said folds to be torn apart and said cartridges to be fed one at a time into the path of said bolt, substantially as described.

12. In a fire arm the combination of gripping rollers; means to operate the same; and a flexible cartridge clip provided with folds adapted to be gripped by said rollers and ripped apart, to feed cartridges to a predetermined position, substantially as described.

13. In a fire arm the combination of gripping rollers; means to operate the same; and a flexible cartridge clip provided with folds detachably secured together adapted to be gripped by said rollers and ripped apart, to feed cartridges to a predetermined position, substantially as described.

14. In a fire arm the combination of an action slide; a breech bolt connected to and operated by said slide; gripping rollers; means for operating said rollers; a flexible cartridge clip provided with detachable folds adapted to be gripped by said rollers and ripped apart; and actuating means connected to said slide and roller operating means, substantially as described.

15. In a fire arm the combination of an action slide; a breech bolt connected to and operated by said slide; gripping rollers; means for operating said rollers; a cartridge holding means provided with flexible folds adapted to be gripped by said rollers and ripped apart; and actuating means connected to said slide and roller operating means, substantially as described.

16. In a fire arm the combination of a hand grip; an action slide, connected to said grip; a bolt connected to said slide; an actuating rod connected to said grip; a feed roller connected to said rod; a flexible cartridge clip having folds adapted to be ripped apart; and means associated with said roller causing said folds to be ripped apart, substantially as described.

17. In a fire arm the combination of a hand grip; an action slide connected to said grip; a bolt connected to said slide; an actuating rod connected to said grip; a feed roller connected to said rod; flexible fabric folds adapted to be ripped and carrying cartridges associated with said feed roller; and means for ripping apart said folds, substantially as described.

18. In a fire arm the combination of a receiver; a flexible cartridge holding means having folds detachably secured together associated with said receiver; and means carried by the arm for separating said folds and feeding the cartridges one at a time to said receiver, substantially as described.

19. In a fire arm the combination of a receiver; a flexible cartridge holding means having folds detachably secured together associated with said receiver; a casing for inclosing said cartridge holding means; and means carried by the arm for separating said folds and feeding the cartridges one at a time to said receiver, substantially as described.

20. In a fire arm the combination of a receiver; a flexible cartridge holding means having folds detachably secured together associated with said receiver; a casing composed of two sections pivoted together for inclosing said cartridge holding means; and means carried by the arm for separating said folds and feeding the cartridges one at a time to said receiver, substantially as described.

21. A cartridge feed holding means comprising flexible cartridge holding folds adapted to be fed to a gun; and readily breakable means for holding said folds together, whereby said folds may be easily separated to release the cartridges while the gun is operating, substantially as described.

22. A cartridge feed holding means comprising a fabric having flexible folds; and readily breakable means for detachably securing said folds together to form cartridge pockets adapted to be readily torn apart during the operation of the gun, substantially as described.

23. A cartridge holding means consisting of a fabric having folds stitched together at intervals to form pockets for the cartridges and having the extreme ends of said folds free and adapted to be gripped to readily tear said folds apart, substantially as described.

24. A cartridge feed having pockets comprising folds; readily breakable means for detachably securing said folds together; and free ends adapted to be readily gripped for tearing said folds apart, substantially as described.

25. In a fire arm the combination of an action slide; a breech bolt; a connection between said slide and bolt; a feed roller; connections for operating said roller; a gas operated means for actuating said slide and last named connections; a flexible cartridge holder having folds adapted to be ripped apart associated with said roller, and means for ripping apart said folds, substantially as described.

26. In a fire arm the combination of means for feeding cartridges comprising a feed roller; a flexible cartridge carrier having readily separated folds associated with said roller; gas operated means for actuating said roller, and means for separating said folds and feeding said cartridges to a predetermined position, substantially as described.

In testimony whereof I affix my signature, in presence of two witnesses.

LEE B. PURCELL.

Witnesses:
LUTHER WELSH,
JOHN DOWNES.